(12) United States Patent
Mizutani et al.

(10) Patent No.: US 7,619,034 B2
(45) Date of Patent: Nov. 17, 2009

(54) INJECTION MOLDING PRODUCED FROM BIODEGRADABLE AROMATIC POLYESTER BLEND COMPOSITION AND PROCESS FOR PRODUCING THE SAME

(75) Inventors: Akiko Mizutani, Tochigi-Ken (JP); Mureo Kaku, Tochigi (JP); Hiroyuki Sumi, Tochigi-Ken (JP)

(73) Assignee: E.I. du Pont de Nemours and Company, Wilmington, DE (US)

( * ) Notice: Subject to any disclaimer, the term of this patent is extended or adjusted under 35 U.S.C. 154(b) by 267 days.

(21) Appl. No.: 10/553,691

(22) PCT Filed: Apr. 19, 2004

(86) PCT No.: PCT/JP2004/005532
§ 371 (c)(1),
(2), (4) Date: Jun. 30, 2006

(87) PCT Pub. No.: WO2004/092266
PCT Pub. Date: Oct. 28, 2004

(65) Prior Publication Data
US 2006/0264569 A1 Nov. 23, 2006

(30) Foreign Application Priority Data
Apr. 18, 2003 (JP) ............................. 2003-114949

(51) Int. Cl.
*C08K 3/10* (2006.01)
*C08K 3/20* (2006.01)
*C08K 3/26* (2006.01)
*C08K 3/30* (2006.01)
*C08L 67/00* (2006.01)

(52) U.S. Cl. ................. 524/601; 524/423; 524/425; 524/33; 524/427; 524/706

(58) Field of Classification Search ................. 524/601, 524/706, 423, 425, 433, 437
See application file for complete search history.

(56) References Cited

U.S. PATENT DOCUMENTS

| 5,969,009 A | * | 10/1999 | Terada et al. | ................ 523/526 |
| 6,538,054 B1 | | 3/2003 | Klatt et al. | |
| 7,388,058 B2 | | 6/2008 | Kaku et al. | |

FOREIGN PATENT DOCUMENTS

| EP | 1297949 A1 | 4/2003 |
| JP | 2000159987 A | 6/2000 |
| JP | 2002356543 A | 12/2002 |

* cited by examiner

*Primary Examiner*—Kriellion A Sanders

(57) ABSTRACT

Provided is an injection molded article that is produced from a molding composition comprising (A) 20 to 98.8 wt. % of at least one polyester, (B) 1 to 60 wt. % of a material selected from the group consisting of reinforcements and fillers, (C) 0.1 to 7 wt. % of a crystallization accelerator, (D) 1 to 60 wt. % of at least one flame retardant selected from among inorganic flame retardants, phosphorus-based flame retardants, and phenolic polymers, and (E) 0.1 to 5 wt. % of a lubricant.

15 Claims, No Drawings

INJECTION MOLDING PRODUCED FROM BIODEGRADABLE AROMATIC POLYESTER BLEND COMPOSITION AND PROCESS FOR PRODUCING THE SAME

TECHNICAL FIELD

The present invention relates to an injection molded product formed of a molding composition comprising at least one polyester selected from the group consisting of a first aromatic polyester copolymer consisting of repeating units derived from terephthalic acid, a metal salt of sulfonic acid, aliphatic dicarboxylic acid, ethylene glycol and diethylene glycol; copolymers prepared by copolymerization or polycondensation of the first polyester with polyethylene glycol; and the polyester comprising relatively less aromatic dicarboxylic acids than that of the other polyesters to be blended and glycol. The molding composition is biodegradable and has extremely desirable mechanical strength, heat resistance and moldability resulting in its being highly suitable for many various applications subject to disposal, if desired, and flame resistance. The present invention also relates to a method of manufacture thereof.

BACKGROUND ART

Prompted by societal concerns and demands concerning the disposal of plastic products such as plastic films, research is being done on biodegradable resin compositions. Active efforts are underway to develop biodegradable aromatic polyester resin compositions which are degradable under the high-humidity, high-temperature conditions associated with waste composting processes. Various uses are being proposed for such compositions. For example, Tokuhyo Hei 5-7507109, 6-505513 and 6-505040 describe polyesters prepared by polymerizing a glycol component made of ethylene glycol and diethylene glycol with two acid components; namely, an alkali metal or alkaline earth metal salt of a sulfonic acid, and terephthalic acid. These prior-art references also describe fibers, films, sheets and fiber nonwoven fabrics composed of such polyesters.

Tokukai 2001-172487 describes biodegradable moldings with inorganic fillers that are vacuum molded from aliphatic polyester sheet. Such moldings have improved modulus, thermal resistance and impact resistance.

Tokukai Hei 9-169897 describes biodegradable sheet with natural fibers. Such sheet has enough strength and heat resistance during use.

Such thermoplastic materials including polyolefin, polyester, polyamide and polyvinyl chloride are useful in molding articles by any of the techniques commonly used with thermoplastic materials, e.g., compression molding, injection molding, extrusion, and blow molding. However, in certain applications such as daily necessities, electronics, appliances, industrial applications and automobile applications, products made from biodegradable polymer would be desirable. Also desirably, the biodegradable polymer would have mechanical strength and heat resistance not less than those of products made from such other thermoplastic materials. It is also well known that addition of fillers into aliphatic polyester molding compositions may improve heat resistance and modulus of elasticity, but may not improve molding cycle, mold release and moldability enough to meet the requirements of the above applications. As noted above, aliphatic polyester resins have improved strength and heat resistance by adding fillers. Yet, they continue to lack sufficient stiffness, impact resistance and heat resistance for practical use in applications such as daily necessities, electronics, appliances, industrial applications and automobile applications. Moreover, when aliphatic polyesters with fillers are injection molded, this causes low moldability such as low mold releasability or long molding cycle.

DISCLOSURE OF INVENTION

To overcome these shortcomings, an injection molded article is formed from an aromatic polyester copolymer having repeating units derived from terephthalic acid, a metal salt of sulfonic acid, an aliphatic dicarboxylic acid, ethylene glycol and diethylene glycol. The article, which has enhanced performance properties, in particular heat resistance and moldability, includes reinforcements and fillers, crystallization accelerator and lubricant to facilitate crystallization of the aromatic polyester molding composition resulting in improvement of moldability.

As mentioned above, the injection molded product formed of the molding composition of the present invention is biodegradable and has extremely desirable mechanical strength, heat resistance and moldability resulting in its being highly suitable for many various applications subject to disposal, if desired, and flame resistance.

BEST MODE FOR CARRYING OUT THE INVENTION

Summary of the Invention

It is therefore an object of the invention to provide an injection molded product made of a molding composition comprising:

(A) 20 to 98.8 wt % of at least one polyester selected from the group consisting of:

an aromatic polyester copolymer (a) having repeating units comprising an acid component and a glycol component, wherein the acid component comprises about 50 to 90 mol % of terephthalic acid, about 0.2 to about 6 mol % of a sulfonic acid metal salt, and about 4 to 49.8 mol % of an aliphatic dicarboxylic acid; wherein the glycol component comprises about 50 to 99.9 mol % of ethylene glycol and about 0.1 to 50 mol % of diethylene glycol;

a polyester copolymer (b) prepared by copolymerization of said copolymer (a) with a polyalkylene glycol;

a branched polyester copolymer (c) prepared by polycondensation of said copolymer (a) with a polyalkylene glycol; and a polyester copolymer (d) having repeating units comprising aromatic dicarboxylic acids and a glycol component; with the proviso that the mol % of said aromatic dicarboxylic acids of said polyester copolymer (d) is less than the mol % of the carboxylic acid content of said copolymers (a), (b), and (c);

(B) 1 to 60 wt. % of a material selected from the group consisting of reinforcements and fillers;

(C) 0.1 to 7 wt. % of a crystallization accelerator;

(D) 1 to 60 wt. % of at least one flame retardant selected from the group consisting of an inorganic flame retardant, a phosphorous-based flame retardant and a phenolic polymer; and (E) 0.1 to 5 wt. % of a lubricant.

The invention also contemplates injection molded products formed of a blend of said polymers (a), (b), (c) and (d) In a preferred embodiment, the injection molded product of the invention has a heat distortion temperature (HDT) not lower than 80° C., and the crystallization speed of the molding composition is faster than 1.6 min at 120° C.

The invention further provides an injection molded product that is biodegradable.

According to a further aspect of the invention, there is provided a method for manufacturing an injection molded product comprising the steps of:

(I) blending
(A) 20 to 98.8 wt. % of at least one polyester selected from the group consisting of:
an aromatic polyester copolymer (a) having repeating units comprising an acid component and a glycol component, wherein the acid component comprises about 50 to 90 mol % of terephthalic acid, about 0.2 to about 6 mol % of sulfonic acid metal salt, and about 4 to 49.8 mol % of aliphatic dicarboxylic acid; wherein the glycol component comprises about 50 to 99.9 mol % of ethylene glycol and about 0.1 to 50 mol % of diethylene glycol;
a polyester copolymer (b) prepared by copolymerization of said copolymer (a) with a polyalkylene glycol;
a branched polyester copolymer (c) prepared by polycondensation of said copolymer (a) with a polyalkylene glycol; and
a polyester copolymer (d) having repeating units comprising aromatic dicarboxylic acids and a glycol component; with the proviso that the mol % of said aromatic dicarboxylic acids of said polyester copolymer is less than the mol % of the carboxylic acid content of said copolymers (a), (b), and (c);
(B) 1 to 60 wt. % of a material selected from the group consisting of reinforcements and fillers;
(C) 0.1 to 7 wt. % of a crystallization accelerator;
(D) 1 to 60 wt. % of at least one flame retardant selected from the group consisting of an inorganic flame retardant, a phosphorous-based flame retardant and a phenolic polymer; and
(E) 0.1 to 5 wt. % of a lubricant; and
(II) injection molding said molding composition prepared by said blending.

DETAILED DESCRIPTION OF THE INVENTION

The injection molded product of the invention, the molding composition and the method of manufacturing thereof are described in detail hereinafter.

The injection molded product of the invention is formed of the molding composition comprising at least one aromatic polyester copolymer selected from the group consisting of the polyester copolymers given below, reinforcements or fillers, a crystallization agent and a lubricant, and optionally other ingredients. All are described below.

Aromatic Polyester Copolymers

An aromatic polyester copolymer (a) has repeating units comprising an acid component and a glycol component. The acid component comprises about 50 to 90 mol %, and preferably, about 52 to 83 mol %, of terephthalic acid.

Further according to the present invention, the acid component comprises about 0.2 to 6 mol %, and preferably about 2 to 5 mol %, of a sulfonic acid metal salt. Illustrative examples of the sulfonic acid metal salt include metal salts of 5-sulfoisophthalic acid, metal salts of 4-sulfoisophthalic acid, and metal salts of 4-sulfophthalic acid. Of these, metal salts of 5-sulfoisophthalic acid are preferred. Preferred examples of the metal ions include ions of alkali metals such as sodium, potassium and lithium, or of alkaline earth metals such as magnesium. The most preferred sulfonic acid metal salt is the sodium salt of 5-sulfoisophthalic acid.

The sulfonic acid metal salt is not only relatively expensive, when used in excess it renders the polyester watersoluble and moreover affects physical characteristics. The sulfonic acid metal salt significantly contributes to the degradability of the molded products using the composition of this invention even at a low content of 0.2 mol %. Further according to the present invention, the acid component comprises about 4 to 49.8 mol %, and preferably about 10 to 45 mol % of aliphatic dicarboxylic acid. At less than 4 mol %, the glass transition temperature cannot be significantly lowered. On the other hand, an aliphatic dicarboxylic acid level in excess of 49.8 mol % invites a decline in the glass transition temperature, causing a loss of suitable stiffness in the molded products.

The aliphatic dicarboxylic acid preferably has 2 to 1 8 carbons, and more preferably 2 to 10 carbons. Illustrative examples include azelaic acid, succinic acid, adipic acid, sebacic acid and glutaric acid. Of these, glutaric acid is preferred.

Composting that involves the degradation of molded articles is typically carried out under high-temperature, high-humidity conditions. Because this is generally done at a temperature of about 70° C. or lower, the aromatic polyester molding compositions of the present invention have a glass transition temperature (Tg) not higher than preferably about 70° C., and especially about 65° C. In the invention, an aliphatic dicarboxylic acid is used to set the glass transition temperature not higher than about 70° C. An ester-forming derivative of the dicarboxylic acid, such as the dimethyl ester, may be used in place of the dicarboxylic acid.

The glycol component comprises about 50 to 99.9 mol % of ethylene glycol and about 0.1 to 50 mol % of diethylene glycol, and preferably about 80 to 98 mol % of ethylene glycol and about 2 to 20 mol. % of diethylene glycol. More than 50 mol % of diethylene glycol units adversely influences the mechanical properties of the film, such as the tensile strength, whereas less than 0.1 mol % results in poor degradability.

The glass transition temperature may be further lowered by substituting up to 20 mol % of the ethylene glycol with another glycol such as triethylene glycol. A balanced range of properties, especially mechanical properties and biodegradability, can be achieved by preparing the injection molded products of the present invention by choosing selected amounts of respective components within the above mol % ranges. If it is desired to enhance the mechanical properties of the molded products, the amount of terephthalic acid is increased, and if it is desired to enhance biodegradability, the amount of aliphatic dicarboxylic acid is increased, resulting in a lower glass transition temperature (Tg).

A polyester copolymer (b) is prepared by copolymerization with the copolymer (a) with polyethylene glycol. The amount of polyethylene glycol component is about 0.1 to 20 wt. %.

A branched polyester copolymer (c) is prepared by polycondensation of the copolymer (a) with polyethylene glycol. Minor amounts of polyfunctional branching agents, such as trimellitic acid, are incorporated to branch polyethylene glycol to modify melt rheology and film processing. The amount of polyethylene glycol component is about 0.1 to 20 wt. %.

Polyethylene glycol used for the copolymers (b) and (c) may be replaced with another polyalkyleneglycol such as polypropylene glycol. The molecular weight should be relatively low to achieve biodegradation and processability.

A polyester copolymer comprises acid components and a glycol component, the acid components comprising aromatic dicarboxylic acids in a lower amount than that of the aromatic carboxylic acids contained in any of the copolymers (a), (b), and (c). For example, poly(butylene succinate), polylactide, or polycaprolactone could be applied.

The weight proportion of the aromatic dicarboxylic acids in the composition of the fourth polyester of the invention should be from 0-70 parts by weight per hundred parts of the polyester, preferably 0-50 parts by weight.

The molding composition of the present invention will comprise 20 to 98.8 wt. %, preferably 40 to 90 wt. %, and most preferably, 50 to 80 wt. % of the polyester copolymers based on the total weight of the polyester copolymers, reinforcements or fillers, crystallization accelerator and lubricant.

Reinforcements or Fillers

The composition of the present information can also contain any reinforcements or fillers universally known to the world. For instance, cited may be glass fiber, carbon fiber, glass flake, potassium titanate, whisker, wollastonite, kaolin, talc, graphite or aramid fibers, glass beads, aluminum silicate, wollastonite, asbestos, calcium carbonate, barium sulfate, mica and the like, and combinations of such materials.

The composition of the present information can also contain natural reinforcements or fillers such as starch, hemp, flax, cotton, pulp, cellulose, diatom, wood powder, rayon and the like, and combinations of such materials. Natural reinforcements can also be wastes such as wood, paper, cacao, tea leaves, soy bean, bamboo, dried garbage and the like.

The compounding ratio of reinforcements or fillers can be selected arbitrarily in accordance with the application of moldings such as desired mechanical characteristics and the molding shape. Generally, it is in the range of 1-60 wt. %, preferably 20-50 wt. %, most preferably 20-40 wt. %. When the amount of fillers compounded is less than 1 wt. %, sufficient improvement in mechanical characteristics cannot be obtained. On the other hand, when the amount of fillers compounded exceeds 60 wt. %, the flow property of the melted composition obtained decreases, causing poor moldability.

A Crystallization Accelerator

The crystallization accelerator should contain at least one of an alkaline metal ion source, an alkaline-earth metal ion source, a zinc ion source, an aliphatic amide and talc in sufficient quantity. Preferably for an alkaline, alkaline-earth, or zinc ion source, the crystallization promoter is one or more organic hydrocarbon acids containing between about 7 and 54 carbon atoms or one or more organic polymers having at least one carboxylic acid group.

The amount of crystallization accelerator is in the range of 0.1-7.0 wt, %, preferably 0.5 to 5 wt. %. When the amount of crystallization accelerator is less than 0.1 wt. %, sufficient crystallization cannot be obtained during the molding process, and this affects moldability. When the amount of crystallization accelerators is more than 7 wt. %, it will affect the mechanical characteristics.

Lubricant

The composition will contain any well-known lubricant that can contribute to crystallization of aromatic polyester copolymers in the present invention. For instance, aliphatic esters such as pentaerythrityl tetrastearate, stearyl stearate, dipentaerythritol distearate, pentaerythrityl distearate, olefin wax, paraffin wax, natural wax and silicone wax can be applied. Pentaerythrityl tetrastearate is preferred, and generally the amount of lubricant is 0.1 to 5 wt. %, preferably 0.5 to 2 wt. %.

Flame Retardant

A common method of imparting flame resistance to thermoplastic polyester resin compositions involves adding a halogenated organic compound as a flame retardant along with an antimony compound that acts as a synergist for the flame retardant. However, the use of halogenated flame retardants has certain drawbacks in that these materials exhaust trace amount of toxic gases on combustion and tend to corrode the barrels of compounding extruders, the surfaces of molding machines, and other equipment they come in contact with at elevated temperatures. Thus, flame retardants that have a smaller effect on environment and machinery are addressed in this patent.

The composition of the present information may contain non-halogenated flame retardants. Inorganic flame retardant, phosphorus-based flame retardant, phenolic polymer, thermo plastic acrylic type polymer and silicone type flame retardant can be used. Inorganic flame retardants include, but are not limited to, $Mg(OH)_2$, $Al(OH)_3$, $CaCO_3$ and $BaSO_4$. Inorganic flame retardant is most preferred due to the environmental friendliness.

The melting point of the composition of the present information is not lower than 170° C. and not more than 240° C., preferably not lower than 180° C. and not more than 220° C. As mentioned above, the inorganic flame retardant is an ideal flame retardant because of its environmental friendliness. But there have been no applications of the inorganic flame retardant to imparting flame resistance to polyester resins such as polyethyleneterephthalate. This is due to the fact that the hydrolysis of the resins proceeds to adversely affect the properties of the resins significantly, as the melting point of polyethyleneterephthalate is higher than the dehydration temperature of the inorganic flame retardant Generally known biodegradable resins do not have such problem because the melting point of the resins is low, that is, around 100 to 170° C., but the strength and the heat resistance of these resins are also low. Therefore, these biodegradable resins are not adequate for use in structural materials requiring flame resistance. On the other hand, the composition of the present information is characterized by lower impact of the dehydration of inorganic flame retardants on resin stability, strength and heat resistance.

The phosphorus-based flame retardant may be organic or inorganic. Suitable inorganic flame retardants include, but are not limited to, red phosphorus, and phosphonate salts of ammonia, aluminum and zinc. Suitable organic phosphorus-based flame retardants include phosphonates, phosphates, and oligomeric and polymeric phosphates. A preferred flame retardant is resorcinol bis(di-2,6-xylyl)phosphate, which is described in Japanese Kokai H9-143350, and is a low cost product marketed under the name PX-200 by Daihachi Chemicals Co., Japan. The phosphorus-based flame retardant should be present in about 0 to about 25 weight percent based on the total weight of the composition. The phenolic polymer may include novolacs or resols. These may be partially or fully cured by heating and/or the use of cross-linking agents. Preferred are novolacs. More preferred are novolacs that do not have added cross-linking agents and are not heat reactive. There is no particular limitation as to the form to be used: pulverized, granular, flake, powder, acicular, liquid, and other forms are suitable. The phenolic polymer may be used as a blend of two or more types.

Phenolic polymer synthesized from renewal resources such as wood can also be used.

In the present invention, the amount of phenolic polymer used should be about 0 to about 25 weight percent based on the total weight of the composition.

Polymerization Process

The aromatic polyester polymer used to form the inventive moldings can generally be prepared by any well-known polymerization method. For example, a straight-chain polyester in which the monomer units are randomly distributed along the molecular chain can be prepared by charging a polymerizer with all of the above monomer constituents together with antimony or some other catalyst, and carrying out polycondensation under suitable polycondensation conditions. Another method that may be used involves initially reacting two or more of the monomer constituents to prepare a prepolymer, then adding the remaining monomer constituents and polymerizing.

The aromatic polyester polymer used to form the moldings of the invention decomposes under the high-humidity, high-temperature conditions typical of composting. Most of the monomer and oligomer (i.e., terephthalic acid, glycol, and oligomers thereof) that form as a result of such degradation are readily digested by microorganisms in the solid wastes or compost, ultimately becoming carbon dioxide and water.

Other Additives

Conventional additives such as plasticizers, toughening agents, nucleating agents, anti-electrification agents, flame retardants, antioxidants, heat stabilizers, cross-linking agents which can impart an enhanced resistance against hydrolysis, dyes and pigments, UV stabilizers and weathering stabilizers may be added to the foregoing aromatic polyester polymer for the purpose of adjusting the moldability or mechanical properties, provided the mechanical characteristics, degradability and other properties critical to the polyester are not altered thereby, and the resulting aromatic polyester composition is capable of being formed by molding.

The polyester copolymer that forms the inventive moldings typically has an intrinsic viscosity within a range of 0.1 to 1.5, and preferably 0.3 to 1.2.

Blending Process

The resin composition used in the present invention can be obtained usually by melt-blending the copolyester, reinforcements or fillers, crystallization accelerator, lubricants and the above-mentioned optional additives with a usual melt-mixer such as monoaxial or biaxial extruder, Banbury mixer, kneader or mixing roll. All or part of the components to be compounded may be supplied to the melt-mixer simultaneously or separately. The most general method is dry-blending the components in advance followed by melt-kneading with the above-mentioned melt-mixer to homogenize, and forming pellets. The pellet-shaped resin composition thus prepared is usually kept in a sufficiently dried state and charged into the molding-machine hopper for molding.

The aromatic polyester moldings of the invention are well-suited for use in a range of applications, including agricultural and horticultural supplies such as plant pots for farming and gardening use, any kinds of daily necessities such as the handles of toothbrushes, containers, dishes, cutleries, and even automobile parts or office automation equipment parts.

Injection Molding

The method further comprises the step of forming injection moldings from the blend of aromatic polyester polymer. The process of forming moldings involves feeding a blend of aromatic polyester polymer-containing flakes to an extruder, melting the flakes, and extruding the melt through a nozzle to the mold die. The molten plastic is cooled, crystallized and solidified in the mold, which is kept closed. By heating the mold to proper temperature at about 120° C., the plastic is crystallized and achieves high heat resistance. Then the mold is opened to eject the solid plastic molded article.

The described compositions are characterized by an unexpected faster speed of crystallization and improvement of heat resistance and moldability. These compositions can also be used in other molding processes that include a crystallization step, such as sheet forming, vacuum molding, injection blowing of bottles and direct blowing of bottles.

EXAMPLES

Examples are given below by way of illustration, although the examples are not intended to limit the scope of the invention.

Test Methods

The methods of measurement and evaluation used in the examples are described below.

Moldability:

Good: Sufficient crystallization and mold release

Poor: poor moldability due to insufficient crystallization and mold release.

Tensile Strength:
  Measured in accordance with ASTM-D638

Elongation:
  Measured in accordance with ASTM-D638

Flexural Strength:
  Measured in accordance with ASTM-D970

Flexural Modulus:
  Measured in accordance with ASTM-D970

Izod Impact Strength:
  Measured in accordance with ASTM-D256

Heat Distortion Temperature(HDT):
  Measured in accordance with ASTM-D648
  Compost Degradability:
  Test pieces of a given size were placed in compost for 15 weeks, following which the specimens were visually examined.
    YES: Shape readily breaks down under outside forces
    NO: No change
  T Max:
    Crystallization speed was evaluated by DSC with a rapid cooling unit which is capable of achieving the maximum cooling rate of 200° C./min. Isothermal measurement was evened out to observe a crystallization peak. Each isothermal curve at measurement temperature (120° C.) was obtained after rapid cooling from 220° C. For the samples evaluated, the time of maximum crystallization T max was collected to show the isothermal properties.

Flame Resistance:

UL Test No. UL-94 (20 mm Vertical Burning Test) using ⅛th inch (3.175 mm) (referred to in the Table 2 as 3.2 mm) thick test pieces.

Examples

In the examples hereafter, copolyester 1 means an aromatic polyester copolymer (density, 1.35 g/cm$^3$; melting point, 200° C.; melt index at 220° C. under 2,160 g of loading, 11 g/10 min) having repeating units composed of an acid component that is about 50 to 90 mol % of terephthalic acid, about 0.2 to 6 mol % of sodium 5-sulfoisophthalate and about 4 to 49.8 mol % of glutaric acid, and a glycol component that is about 50 to 99.9 mol % of ethylene glycol and about 0.1 to 50 mol % of diethylene glycol.

Copolyester 2 means an aromatic polyester copolymer (density, 1.35 g/cm³; melting point, 200° C.; melt index at 220° C. under-2,160 g of loading, 28 g/10 min) prepared by copolymerization with the copolyester 1 with 1 to 20 wt. % polyethylene glycol.

Copolyester 3 means a branched aromatic polyester copolymer (density, 1.35 g/cm³; melting point, 185° C.; melt index at 220° C. under 2,160 g of loading, 23 g/10 min) prepared by copolymerizing copolymer with 1 to 20 wt. % polyethylene glycol.

In Table 1 and 2, each material name stands for,
GF: glass fiber,
StNa: sodium stearate,
Mon.Na: Sodium Montanate,
PTS: pentaerythrityl tetrastearate,
PX-200: resorcinol bis(di-2,6-xylyl),
Phenolic polymer: Novolac HRJ 1 2700CP manufactured by Schenectady International, Inc.

Example 1

Flakes (small particles) of an aromatic polyester copolymer 1 and 30 wt. % of glass fiber, 0.4 wt. % of montan wax acid sodium salt and 0.2 wt. % of pentaerythrityl tetrastearate were compounded and pelletized. The pellets were pre-dried and then melted in a 200 mm diameter extruder at a cylinder temperature setting of 200 to 220° C. The melt was injection molded at a die temperature of 120° C. The physical properties are shown in Table 1.

Example 2

Flakes (small particles) of an aromatic polyester copolymer 1 and 30 wt. % of talc, 0.8 wt. % of sodium stearate and 1.0 wt. % of pentaerythrityl tetrastearate were compounded and pelletized. The pellets were pre-dried and then melted in a 200 mm diameter extruder at a cylinder temperature setting of 200 to 220° C. The melt was injection molded at a die temperature of 120° C. The physical properties are shown in Table 1.

Example 3

Flakes (small particles) of an aromatic polyester copolymer 1 and 20 wt. % of talc and 10 wt. % of glass fiber, 0.8 wt. % of sodium stearate and 1.0 wt. % of pentaerythrityl tetrastearate were compounded and palletized. The pellets were pre-dried and then melted in a 200 mm diameter extruder at a cylinder temperature setting of 200 to 220° C. The melt was injection molded at a die temperature of 120° C. The physical properties are shown in Table 1.

Example 4

Flakes (small particles) of an aromatic polyester copolymer 2 and 30 wt. % of glass fiber, 0.8 wt. % of sodium stearate and 0.5 wt. % of pentaerythrityl tetrastearate were compounded and pelletized. The pellets were pre-dried and then melted in a 200 mm diameter extruder at a cylinder temperature setting of 200 to 220° C. The melt was injection molded at a die temperature of 120° C. The physical properties Ware shown in Table 1.

Example 5

Flakes (small particles) of an aromatic polyester copolymer 3 and 30 wt. % of glass fiber, 0.8 wt. % of sodium stearate and 0.5 wt. % of pentaerythrityl tetrastearate were compounded and pelletized. The pellets were pre-dried and then melted in a 200 mm diameter extruder at a cylinder temperature setting of 200 to 220° C. The melt was injection molded at a die temperature of 120° C. The physical properties are shown in Table 1.

Comparative Example A

Flakes (small particles) of an aromatic polyester copolymer 1 and 30 wt. % of glass fiber were compounded and pelletized. The pellets were pre-dried and then melted in a 200 mm diameter extruder at a cylinder temperature setting of 200 to 220° C. The melt was injection molded at a die temperature of 120° C. The physical properties are shown in Table 1.

Comparative Example B

Flakes (small particles) of an aromatic polyester copolymer 1 and 30 wt. % of glass fiber, 0.4 wt. % of montan wax acid sodium salt were compounded and pelletized. The pellets were pre-dried and then melted in a 200 mm diameter extruder at a cylinder temperature setting of 200 to 220° C. The melt was injection molded at a die temperature of 120° C. The physical properties are shown in Table 1.

Comparative Example C

Flakes (small particles) of an aromatic polyester copolymer 1 and 30 wt. % of kaolin were compounded and pelletized. The pellets were pre-dried and then melted in a 200 mm diameter extruder at a cylinder temperature setting of 200 to 220° C. The melt was injection molded at a die temperature of 120° C. The physical properties are shown in Table 1.

TABLE I

Physical properties of aromatic polyester moldings

| | Ex. 1 | Ex. 2 | Ex. 3 | Ex. 4 | Ex. 5 | Comp. ex. A | Comp. ex. B | Comp. ex. C |
|---|---|---|---|---|---|---|---|---|
| Polymer | 1) | 1) | 1) | 2) | 3) | 1) | 1) | 1) |
| Additives | GF 30% | talc 30% | talc 20% | GF 30% | GF 30% | GF 30% | GF 30% | kaolin 30% |
| | Mon Na 0.4% | St.Na 0.8% | GF 10% | St.Na 0.8% | St. Na 0.8% | | Mon. Na 0.4% | |
| | PTS 0.2% | PTS 1.0% | St.Na 0.8% | PTS 0.5% | PTS 0.5% | | | |
| | | | PTS 1.0% | | | | | |

TABLE I-continued

Physical properties of aromatic polyester moldings

| | Ex. 1 | Ex. 2 | Ex. 3 | Ex. 4 | Ex. 5 | Comp. ex. A | Comp. ex. B | Comp. ex. C |
|---|---|---|---|---|---|---|---|---|
| Moldability | good | good | good | good | good | poor | poor | poor |
| Tensile strength at break (kgf/mm$^2$) | 12.2 | 4.6 | 7.0 | 9.2 | 7.4 | 10.3 | 10.8 | 7.8 |
| Tensile elongation (%) | 1.7 | 1.4 | 1.5 | 3.1 | 3.1 | 3.8 | 3.3 | 3.0 |
| Flexural strength (kgf/mm$^2$) | 19.8 | 9.1 | 11.2 | 14.7 | 13.3 | 18.5 | 18.6 | 9.4 |
| Flexural modulus (kgf/mm$^2$) | 1070 | 730 | 880 | 824 | 750 | 990 | 1000 | 560 |
| Izod impact strength (cm · kgf/cm) | 7.1 | 2.2 | 3.7 | 7.8 | 6.3 | 7.4 | 8.0 | 2.5 |
| HDT (die temp. 120° C.) | 178 | 80 | 168 | 175 | 163 | Poor moldability | poor moldability | Poor moldability |
| Compost degradability | YES | YES | YES | YES | YES | YES | YES | YES |
| T max (min. at 120° C.) | 0.8 | 0.5 | 0.5 | — | — | 1.8 | 1.3 | 1.3 |

It can be seen from the data in Table 1 that copolyester 1) in Examples 1 to 3 achieves faster crystallization speed (by T max) than Comp.Ex.A-C by adding crystallization accelerator and lubricant, which also provides good moldability and high HDT. Copolyester 2) and 3) in Example 4 and 5 can also achieve high HDT by additions of both crystallization accelerator and lubricant as seen in Table 1. In the following Examples, inorganic flame retardant or phosphorus-based flame retardant was blended with the compositions of the present invention. The pellets and test pieces were prepared as described in the same manner as that for Examples 1-5, above, and the results are reported in Table 2, below.

Example 6

Flakes (small particles) of an aromatic polyester copolymer 2 and 30 wt. % of glass fiber, 18 wt. % of resorcinol bis(di-2,6-xylyl)phosphate(PX-200), 8 wt. % of phenolic polymer, 0.8 wt. % of sodium stearate and 1.0 wt. % of pentaerythrityl tetrastearate were compounded and pelletized. The pellets were pre-dried and then melted in a 200 mm diameter extruder at a cylinder temperature setting of 200 to 220° C. The melt was injection molded at a die temperature of 120° C. The physical properties are shown in Table 2.

Example 7

Flakes (small particles) of an aromatic polyester copolymer 2 and 30 wt. % of Mg(OH)$_2$, 30 wt. % of glass fiber, 0.8 wt. % of sodium stearate and 1.0 wt. % of pentaerythrityl tetrastearate were compounded and pelletized. The pellets were pre-dried and then melted in a 200 mm diameter extruder at a cylinder temperature setting of 200 to 220° C. The melt was injection molded at a die temperature of 120° C. The physical properties are shown in Table 2.

Comparative Example D

Flakes (small particles) of an aromatic polyester copolymer 2 and 30 wt. % of glass fiber, 20 wt. % of talc, 0.8 wt % of sodium stearate and 1.0 wt. % of pentaerythrityl tetrastearate were compounded and pelletized. The pellets were pre-dried and then melted in a 200 mm diameter extruder at a cylinder temperature setting of 200 to 220° C. The melt was injection molded at a die temperature of 120° C. The physical properties are shown in Table 2.

TABLE 2

Physical properties of aromatic polyester moldings

| | Example 6 | Example 7 | Comp. Ex. D |
|---|---|---|---|
| Polyester copolymer 2 | 42.2 | 38.2 | 48.2 |
| PX-200 | 18.0 | | |
| Phenolic polymer | 8.0 | | |
| Mg(OH)$_2$ | | 30 | |
| Glass Fiber | 30 | 30 | 30 |
| Talc | | | 20 |
| Sodium Stearate | 0.8 | 0.8 | 0.8 |
| Pentaerythrityl tetrastearate | 1.0 | 1.0 | 1.0 |
| Tensile strength (kgf/mm$^2$) | 6.3 | 8.6 | 7.7 |
| Elongation at break (%) | 1.2 | 1.0 | 2.4 |
| Flexural strength (kgf/mm$^2$) | 9.2 | 12.3 | 11.2 |
| Flexural modulus (kgf/mm$^2$) | 770 | 1330 | 760 |

TABLE 2-continued

Physical properties of aromatic polyester moldings

|  | Example 6 | Example 7 | Comp. Ex. D |
|---|---|---|---|
| Notched Izod impact strength (cm * kgf/cm) | 5.1 | 7.4 | 5.6 |
| Flame resistance (3.2 mm) | V-0 | V-0 | Out |
| HDT(° C.) | 144 | 163 | 180 |

It can be seen from the data in Table 2 that copolyester 2 can achieve flame resistance V-0 at 3.2 mm. See Examples and 7 compared with Comp.Ex.D.

The invention claimed is:

1. An injection molded product made of a compost degradable thermoplastic molding composition comprising
   (A) 20 to 98.8 wt. % of an aromatic polyester copolymer (a) having repeating units comprising an acid component and a glycol component, wherein the acid component comprises about 50 to 90 mol % of terephthalic acid, about 0.2 to about 6 mol % of sulfonic acid metal salt, and about 4 to 49.8 mol % of aliphatic dicarboxylic acid; wherein the glycol component comprises about 50 to 99.9 mol % of ethylene glycol and about 0.1 to 50 mol % of diethylene glycol; and one or more polyester copolymers selected from the group consisting of:
      a polyester copolymer (b) prepared by copolymerization with said copolymer (a) with polyalkylene glycol;
      a branched polyester copolymer (c) prepared by polycondensation of said copolymer (a) with polyalkylene glycol; and
      a polyester copolymer (d) having repeating units comprising aromatic dicarboxylic acids and a glycol component; wherein the weight proportion of the aromatic dicarboxylic acids in copolymer (d) is from 0 to 70 parts by weight per hundred parts of polyester (d); and
   with the proviso that the mol % of said aromatic dicarboxylic acids of said polyester copolymer (d) is less than the mol % of the carboxylic acid content of said copolymers (a), (b), and (c);
   (B) 1 to 60 wt. % of material selected from the group consisting of reinforcements and fillers;
   (C) 0.1 to 7 wt. % of crystallization accelerator;
   (D) 1 to 60 wt. % of at least one flame retardant selected from the group consisting of an inorganic flame retardant, a phosphorous-based flame retardant and a phenolic polymer; and
   (E) 0.1 to 5 wt. % of lubricant.

2. The injection molded product of claim 1, in which the inorganic flame retardant is an inorganic hydroxide.

3. The injection molded product of claim 1, in which the melting point of the molded product is not lower than 170° C. and not more than 240° C.

4. The injection molded product of any one of claims 1 to 3 in which the molding composition is a blend of said copolymers (a), (b), (c) and (d).

5. The injection molded product of claim 1 wherein said product has heat distortion at temperature not lower than 80° C. and the crystallization speed is faster than 1.2 min. at 120° C.

6. The injection molded product of claim 2 wherein said product has heat distortion at temperature not lower than 80° C. and the crystallization speed is faster than 1.2 min. at 120° C.

7. The injection molded product of claim 3 wherein said product has heat distortion at temperature not lower than 80° C. and the crystallization speed is faster than 1.2 min. at 120° C.

8. The injection molded product of claim 4 wherein said product has heat distortion at temperature not lower than 80° C. and the crystallization speed is faster than 1.2 min. at 120° C.

9. The injection molded product of claim 2, in which the inorganic flame retardant is selected from the group consisting of $Mg(OH)_2$, $Al(OH)_3$, $CaCO_3$ and $BaSO_4$.

10. A compost degradable thermoplastic molding composition comprising
    (A) 20 to 98.8 wt. % of an aromatic polyester copolymer (a) having repeating units comprising an acid component and a glycol component, wherein the acid component comprises about 50 to 90 mol % of terephthalic acid, about 0.2 to about 6 mol % of sulfonic acid metal salt, and about 4 to 49.8 mol % of aliphatic dicarboxylic acid; wherein the glycol component comprises about 50 to 99.9 mol % of ethylene glycol and about 0.1 to 50 mol % of diethylene glycol; and one or more polyester copolymers selected from the group consisting of:
       a polyester copolymer (b) prepared by copolymerization with said copolymer (a) with polyalkylene glycol;
       a branched polyester copolymer (c) prepared by polycondensation of said copolymer (a) with polyalkylene glycol; and
       a polyester copolymer (d) having repeating units comprising aromatic dicarboxylic acids and a glycol component; wherein the weight proportion of the aromatic dicarboxylic acids in copolymer (d) is from 0 to 70 parts by weight per hundred parts of polyester (d); and
    with the proviso that the mol % of said aromatic dicarboxylic acids of said polyester copolymer (d) is less than the mol % of the carboxylic acid content of said copolymers (a), (b), and (c);
    (B) 1 to 60 wt. % of material selected from the group consisting of reinforcements and fillers;
    (C) 0.1 to 7 wt. % of crystallization accelerator;
    (D) 1 to 60 wt. % of at least one flame retardant selected from the group consisting of an inorganic flame retardant, a phosphorous-based flame retardant and a phenolic polymer; and
    (E) 0.1 to 5 wt. % of lubricant.

11. The compost degradable thermoplastic molding composition of claim 10, in which the inorganic flame retardant is an inorganic hydroxide.

12. The compost degradable thermoplastic molding composition of claim 11, in which the inorganic flame retardant is selected from the group consisting of $Mg(OH)_2$, $Al(OH)_3$, $CaCO_3$ and $BaSO_4$.

13. The compost degradable thermoplastic molding composition of claim 10, in which the melting point is not lower than 170° C. and not more than 240° C.

14. The compost degradable thermoplastic molding composition of claim 10 that is a blend of said copolymers (a), (b), (c) and (d).

15. The compost degradable thermoplastic molding composition of claim 10 having a heat distortion at temperature not lower than 80° C. and a crystallization speed faster than 1.2 min. at 120° C.

* * * * *

UNITED STATES PATENT AND TRADEMARK OFFICE
CERTIFICATE OF CORRECTION

PATENT NO. : 7,619,034 B2
APPLICATION NO. : 10/553691
DATED : November 17, 2009
INVENTOR(S) : Mizutani et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 471 days.

Signed and Sealed this

Twenty-sixth Day of October, 2010

David J. Kappos
*Director of the United States Patent and Trademark Office*